(12) United States Patent
Foo et al.

(10) Patent No.: US 6,459,366 B1
(45) Date of Patent: Oct. 1, 2002

(54) SYSTEM AND METHOD FOR CONTROLLING AN ACTUATABLE OCCUPANT PROTECTION DEVICE

(75) Inventors: Chek-Peng Foo, Ann Arbor; Huahn Fern Yeh, Novi, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/615,079

(22) Filed: Jul. 12, 2000

(51) Int. Cl.⁷ .................................................. B60Q 1/00
(52) U.S. Cl. ........................ 340/436; 340/438; 340/669; 701/45; 701/46
(58) Field of Search ................................. 340/436, 438, 340/669; 701/45, 46

(56) References Cited

U.S. PATENT DOCUMENTS

| | | | |
|---|---|---|---|
| 5,461,567 A | | 10/1995 | Kelley et al. .............. 340/436 |
| 5,504,379 A | | 4/1996 | Mazur et al. |
| 5,505,486 A | * | 4/1996 | Ahn ........................ 280/730.1 |
| 5,587,906 A | * | 12/1996 | McIver et al. .............. 340/436 |
| 5,702,124 A | * | 12/1997 | Foo et al. ................... 280/735 |
| 5,746,444 A | * | 5/1998 | Foo et al. ................... 340/436 |
| 5,835,613 A | * | 11/1998 | Breed et al. ................. 340/436 |
| 5,900,807 A | * | 5/1999 | Moriyama et al. .......... 340/436 |
| 5,935,182 A | | 8/1999 | Foo et al. ................... 340/436 |
| 6,035,225 A | * | 3/2000 | Foo et al. ................... 280/735 |
| 6,084,314 A | * | 7/2000 | McCurdy ................... 307/10.1 |

* cited by examiner

Primary Examiner—Jeffery Hofsass
Assistant Examiner—Hung Nguyen
(74) Attorney, Agent, or Firm—Tarolli, Sundheim, Covell, Tummino & Szabo L.L.P.

(57) ABSTRACT

A system (10) for controlling an actuatable occupant protection device (44, 46, 52, 48, 50, 54) includes an actuatable headrest device (44, 48) which, when actuated, helps protect an occupant of a vehicle seat (42, 43). A crash sensor (22) is operative to sense a condition of a vehicle (20) and provide a crash sensor signal having an electrical characteristic indicative of the sensed vehicle condition. A controller (24) is coupled to the actuatable headrest device (44, 48) and the crash sensor (22). The controller (24) determines a crash velocity value and a crash displacement value based on the crash sensor signal. The controller (24) has a threshold value functionally related to the determined crash displacement value. The controller (24) controls actuation of the actuatable headrest device (44, 48) in response to the determined crash velocity value relative to the threshold value.

22 Claims, 4 Drawing Sheets

SYSTEM AND METHOD FOR CONTROLLING AN ACTUATABLE OCCUPANT PROTECTION DEVICE

TECHNICAL FIELD

The present invention relates to a vehicle occupant protection system and, more particularly, to a system and method for controlling one or more actuatable occupant protection devices, including an actuatable headrest restraint.

BACKGROUND OF THE INVENTION

Actuatable occupant restraint systems, such as air bags, for vehicles are well known in the art. Such restraint systems include one or more collision sensing devices for sensing vehicle crash acceleration. Air bag restraint systems further include an electrically actuatable igniter, referred to as a squib. When the collision sensing device senses a deployment crash event, an electrical current of sufficient magnitude and duration is passed through the squib to ignite the squib. When ignited, the squib initiates the flow of inflation fluid into an air bag from a source of inflation fluid, as is known in the art.

Certain known collision sensing devices used in actuatable occupant restraint systems are mechanical in nature. Still other known actuatable occupant restraint systems for vehicles include an electrical transducer, such as an accelerometer, for sensing vehicle crash acceleration. A system using an accelerometer as a crash or collision sensor further includes some circuitry, e.g., a controller, for monitoring the output of the accelerometer. The accelerometer provides a signal having an electrical characteristic indicative of the vehicle's crash acceleration. The accelerometer is operatively connected to a controller, such as a microcomputer, which performs a crash algorithm on the acceleration signal for the purpose of discriminating between a deployment and a non-deployment crash event. When a deployment crash event is determined to be occurring, the restraint device is actuated, e.g., an air bag is deployed.

Many types of crash algorithms for discriminating between deployment and non-deployment crash events are known in the art. Algorithms typically are adapted to detect particular types of crash events for particular vehicle platforms. One example of such an algorithm is taught in U.S. Pat. No. 5,587,906. Other examples of systems for discriminating vehicle crash events are disclosed in U.S. Pat. Nos. 5,935,182 and U.S. Pat. No. 5,758,899.

Air bag restraint systems are also known to require more than one sensor for detection of a deployment crash event. Often, the plural sensors are arranged in a voting scheme in which all the sensors must "agree" that a deployment crash event is occurring before restraint actuation is initiated. In certain known arrangements having a first and second sensor, the second sensor is referred to as a "safing sensor." Air bag actuation occurs only if the first sensor and the safing sensor indicate a deployment crash event is occurring.

SUMMARY OF THE INVENTION

One aspect of the present invention provides a system for controlling an actuatable occupant protection device. The system includes an actuatable headrest device which, when actuated, helps protect an occupant of a vehicle seat. A crash sensor is operative to sense a condition of the vehicle and provide a crash sensor signal having an electrical characteristic indicative of the sensed vehicle condition. A controller is coupled to the actuatable headrest device and the crash sensor. The controller determines a crash velocity value and a crash displacement value based on the crash sensor signal. The controller has a threshold value functionally related to the determined crash displacement value. The controller controls actuation of the actuatable headrest device in response to the determined crash velocity value relative to the threshold value.

Another aspect of the present invention provides a method for helping protect a vehicle occupant during a vehicle crash event. The method includes sensing vehicle acceleration and determining a crash velocity value based on the sensed acceleration. A crash displacement value is determined as a function of the sensed acceleration. A threshold is provided having a value functionally related to determined crash displacement. Actuation of an actuatable headrest device is controlled in response to the determined crash velocity value relative to the value of the threshold.

BRIEF DESCRIPTION OF THE DRAWINGS

The foregoing and other features and advantages of the invention will become more apparent to one skilled in the art upon consideration of the following description of the invention and the accompanying drawings in which.

DESCRIPTION OF AN EXEMPLARY EMBODIMENT

Figure 1:
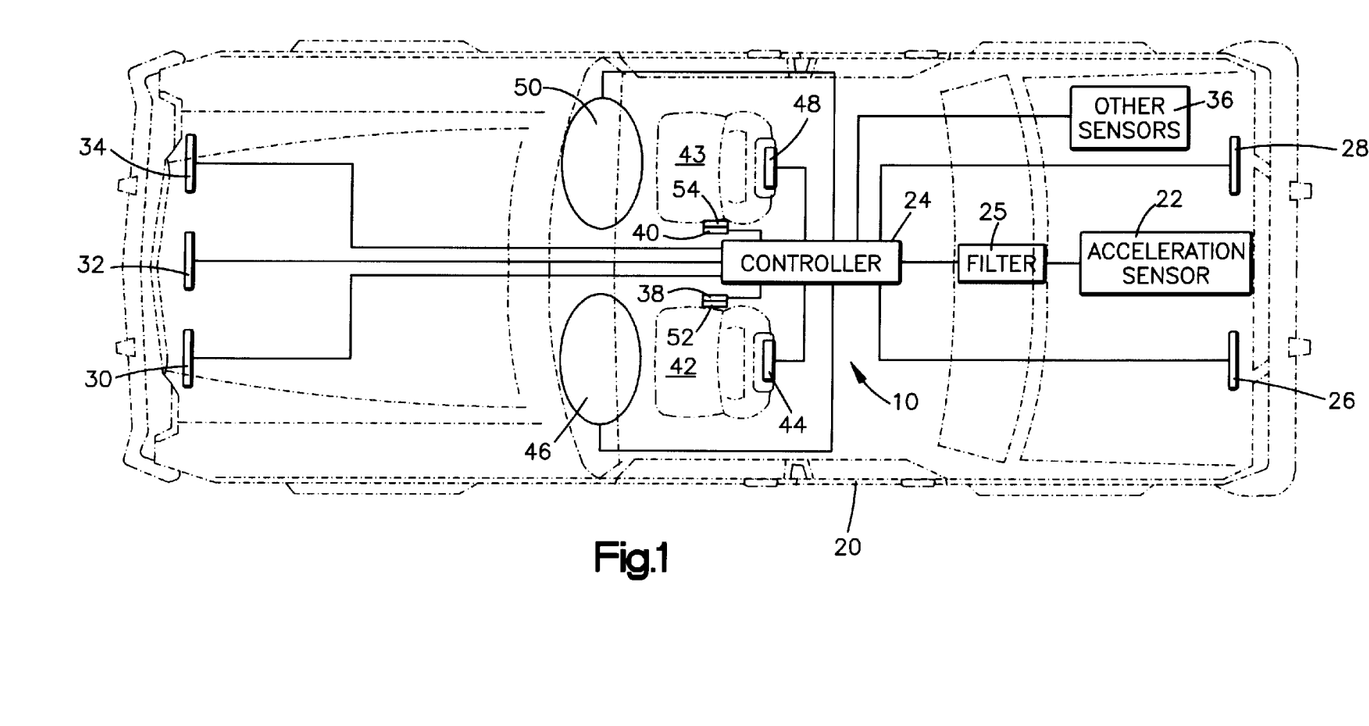
FIG. 1 is a schematic block diagram of a vehicle equipped with an occupant protection system in accordance with the present invention.

FIG. 1 illustrates an occupant protection system 10 operatively mounted in a vehicle 20 for helping protect a vehicle occupant during a vehicle crash event. The system 10 includes an acceleration sensor 22 for detecting vehicle crash acceleration and providing a signal having an electrical characteristic indicative thereof. The acceleration sensor 22 is electrically connected to a controller 24 through an appropriate filter 25. The filter 25 removes noise and frequency components from the acceleration signal that are not useful in discriminating a vehicle crash condition. The filter function could occur in the acceleration sensor itself and/or through separate circuitry in a module containing the acceleration sensor 22. Further filtering of the acceleration signal also may occur in the controller 24 using digital filtering techniques.

The controller 24 monitors the filtered acceleration signal and performs a crash algorithm to discriminate between deployment and non-deployment crash events. The crash algorithm performed by the controller 24, in accordance with the present invention, uses an occupant spring mass model to adjust a value of the crash acceleration signal. The adjusted crash acceleration signal is used by the controller 24 to determine whether a deployment crash event is occurring.

The occupant protection system 10 also includes one or more other crush zone sensing devices 26, 28, 30, 32, 34, and other sensors 36 which are connected to the controller 24. Each crush zone sensing device 26–34 and other sensors 36 provides a signal to the controller 24 having a characteristic indicative of the condition sensed thereby, such as acceleration The crash algorithm of the controller 24 evaluates these signals to further help discriminate between deployment and non-deployment crash events.

By way of example, crush zone sensors 26 and 28 are crush zone sensors mounted in a rearward portion of the vehicle 20, with each sensor 26, 28 being located on an associated rear side of the vehicle 20. The system 10 also includes front crush zone sensors 30, 32, and 34 mounted in a forward portion of the vehicle 20. Sensors 30 and 34 are located on associated front sides of the vehicle 20 and crush zone sensor 32 is located in a forward center portion of the vehicle. The signals from the crush zone sensors 26–34, for example, have frequency and amplitude components that are functionally related to crash acceleration experienced by the vehicle. The crush zone sensors 26–34, alternatively, could be crush sensor switches responsive to deformation or displacement of the associated portion of the vehicle 20 where the sensors are mounted.

The other crash sensors 36 also provide a signal to the controller 24, each signal having an electrical characteristic indicative of the occurrence of a vehicle crash event. The other sensors 36, for example, may be one or more additional acceleration sensors, an inertia responsive switch, or other sensing devices capable of detecting the occurrence of a vehicle crash event and providing a signal indicative thereof.

The system 10 also includes buckle switch sensors 38 and 40 associated respectively with a driver side seat 42 and a passenger side seat 43. Each of the buckle switch sensors 38, 40 is electrically connected with the controller 24 for providing a buckle switch signal indicating whether its associated seat belt is buckled or unbuckled.

The controller 24 controls actuation of one or more vehicle occupant protection device associated with each respective vehicle seat. By way of example, each vehicle seat 42, 43 has associated with it an active headrest restraint ("AHR") device 44, 48 and a frontal actuatable occupant protection device, such an air bag 46, 50, for, when actuated, helping protect the vehicle occupant of each respective seat 42, 43. An actuatable seat belt pretensioner device 52, 54 also is associated with each respective vehicle seat 42 and 43. The pretensioner is actuated by the controller 24 during a vehicle crash event to tighten a seat belt around the vehicle occupant in a known manner.

In the exemplary embodiment shown in FIG. 1, each of the frontal air bags 46, 50 and each seat belt pretensioner 53, 54 has an associated squib (not shown). When the squib is energized with sufficient electric current for a sufficient time period, it initiates fluid flow from an associated fluid source as is known in the art. The AHR devices 44 and 46 also may be inflatable occupant protection devices having squibs. Alternatively, the AHR devices 44 and 46 could be mechanical in nature, which are actuated by the controller 24 in response to detecting a rear impact crash event. The controller 24 performs a crash algorithm using crash metrics and outputs one or more signals to actuate the appropriate actuatable occupant protection devices.

Figure 2:
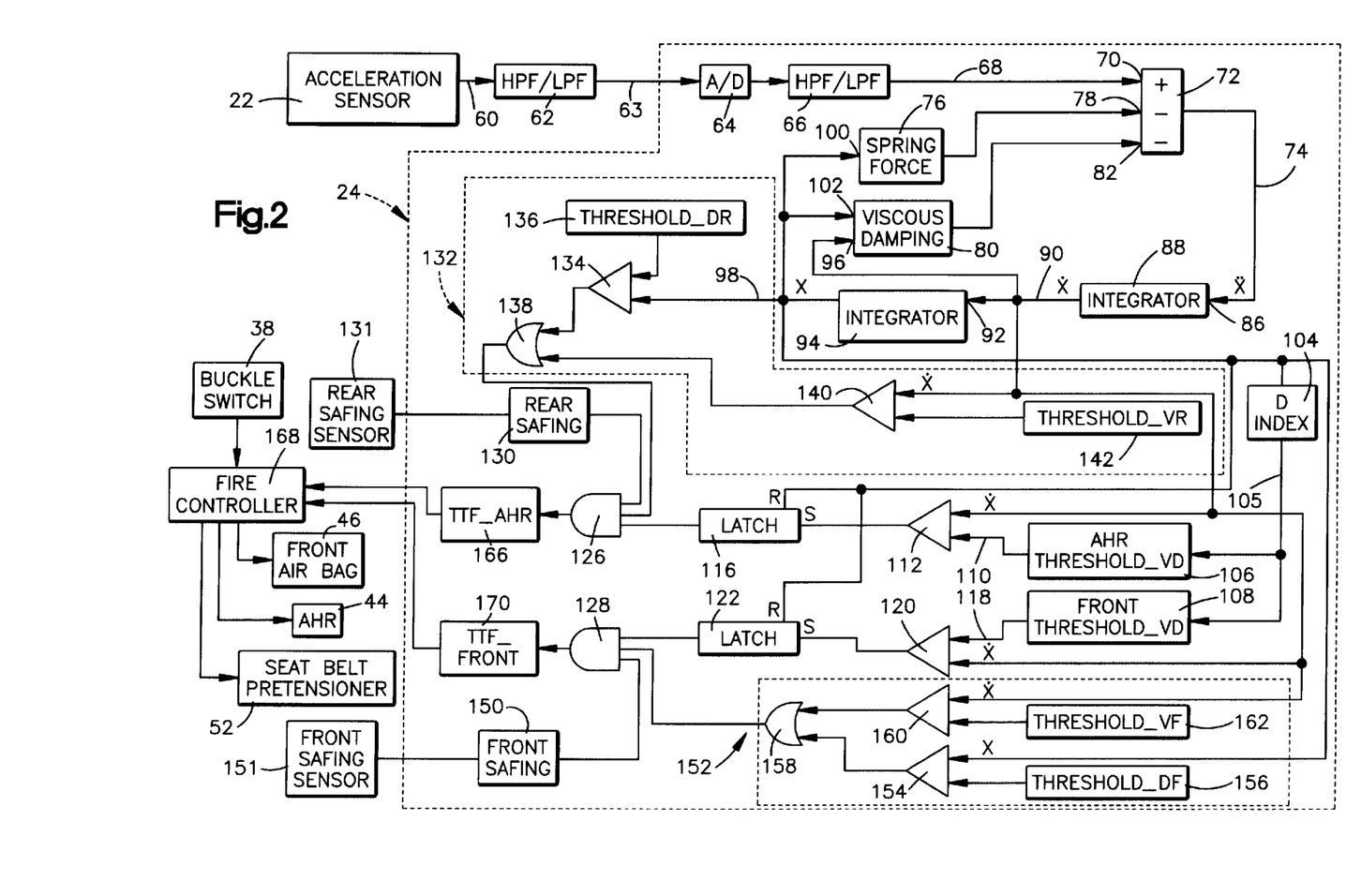
FIG. 2 is a functional block diagram of part of the system of FIG. 1 shown in more detail.

FIG. 2 is a functional block diagram schematically representing a control process performed by the controller 24 of FIG. 1, in accordance with the present invention, for controlling actuation of the occupant protection devices 44, 46, and 52 associated with the driver side seat (e.g., 42 of FIG. 1). Although FIG. 2 is described with respect to the driver side vehicle seat 42 and associated occupant protection devices 44, 46, and 52, a similar control arrangement is used for the passenger side vehicle seat 43 and associated occupant protection devices 48, 50, and 54. Identical reference numbers are used to identify corresponding parts previously shown and described with respect to FIG. 1. The elements shown in the controller block 24 correspond with operations performed internally by the controller. The controller 24, for example, is a microcomputer programmed to perform these operations. Such functions alternatively could be performed with discrete circuitry, analog circuitry, a combination of analog and discrete components or an application specific integrated circuit.

The acceleration sensor 22, for example, an accelerometer, outputs a first acceleration signal 60 having an electrical characteristic (e.g., frequency and amplitude) indicative of the vehicle's crash acceleration upon the occurrence of a crash event. By way of example, the accelerometer 22 has a nominal sensitivity of ±100 g's (g being the value of acceleration due to earth's gravity, i.e., 32 feet per second squared or 9.8 m/s$^2$) . The accelerometer 22 has an axis sensitivity aligned parallel with the direction of travel of the vehicle (e.g., extending front-to-aft). As used herein for purposes of explanation, a frontal impact crash event results in a positive value of crash acceleration and a rear impact crash situation results in a negative value of crash acceleration.

The acceleration signal 60 is filtered by, for example, an analog high-pass-filter/low-pass-filter ("HPF/LPF") 62. The HPF/LPF filter 62 helps eliminate frequencies resulting from extraneous vehicle operating events and/or input signals resulting from road noise. The frequency components removed through filtering are not indicative of the occurrence of a crash event for which actuation of one or more of the occupant protection devices 44, 46, 52 is desired. Empirical testing is used to determine the frequency values of relevant crash signals for a vehicle platform of interest. Extraneous signal components that may be present in the crash acceleration signal 60 are appropriately filtered and frequencies indicative of a deployment crash event are passed as a filtered output signal 63 for further processing.

The filtered output signal 63 is provided to an analog-to-digital ("A/D") converter 64. In this exemplary embodiment, the A/D converter 64 is located internal to the controller 24 (e.g., an A/D input of a microcomputer), although it alternatively could be external to the controller. The A/D converter 64 converts the filtered crash acceleration signal 63 into a digital signal. The output of the A/D converter 64 is filtered with another HPF/LPF filter function 66. The filter function 66 has filter values empirically determined for the purpose of eliminating small drifts and offsets as well as to further reduce extraneous signal noise not useful in discriminating a vehicle crash event. In a microcomputer embodiment of the present invention, for example, the filter function 66 is digitally implemented within the microcomputer. The filtering function 66 outputs a filtered acceleration signal 68 to a positive input 70 of a summing function 72.

As mentioned above, the controller 24 processes the crash acceleration signal 60 using an occupant spring-mass model. The spring-mass model provides an adjusted crash acceleration signal that is adjusted for spring force and viscous damping. In particular, the spring-mass model is used to provide an adjusted crash acceleration signal 74 output from the summing function 72. The adjusted acceleration signal 74 is used to discriminate between deployment and non-deployment crash events for each of the occupant protection devices associated with each vehicle seat. When the vehicle is subjected to a crash condition from a direction having a front-to-rear component (e.g., a frontal or rear impact situation), the resulting crash acceleration experienced by the vehicle is considered to be the driving function which gives an initial pulse to the occupant spring-mass model. A spring force, which is a function of displacement, is a force on the occupant that results from the seat and the seat belt system. A damping force, which is a function of both determined velocity and determined displacement, is a force providing a frictional effect on the occupant resulting from the seat-belt system. That is to say, the friction resulting from the seat belt stretching due to occupant loading during a vehicle crash condition defines the damping force. An exemplary description of a spring-mass model for use in the present invention is found in U.S. Pat. No. 5,935,182 to Foo et al., which is assigned to TRW Inc.

The velocity versus displacement values are divided into four quadrants I, II, III, and IV. Each quadrant corresponds to different ranges of displacement and velocity. By way of example, quadrant I is used when the virtual occupant displacement and velocity values are both greater than or equal to zero. The slope of quadrant I, for example, ranges from about 1 to about 12 Hz. Quadrant II is employed when the virtual occupant displacement value is determined to be less than zero and the virtual occupant velocity value is greater than or equal to zero. Quadrant III is used in a situation when the virtual occupant displacement and velocity values are both less than zero. Finally, quadrant IV is used in a situation when the virtual occupant displacement value is greater than or equal to zero and the virtual occupant velocity value is less than zero.

Figure 3:
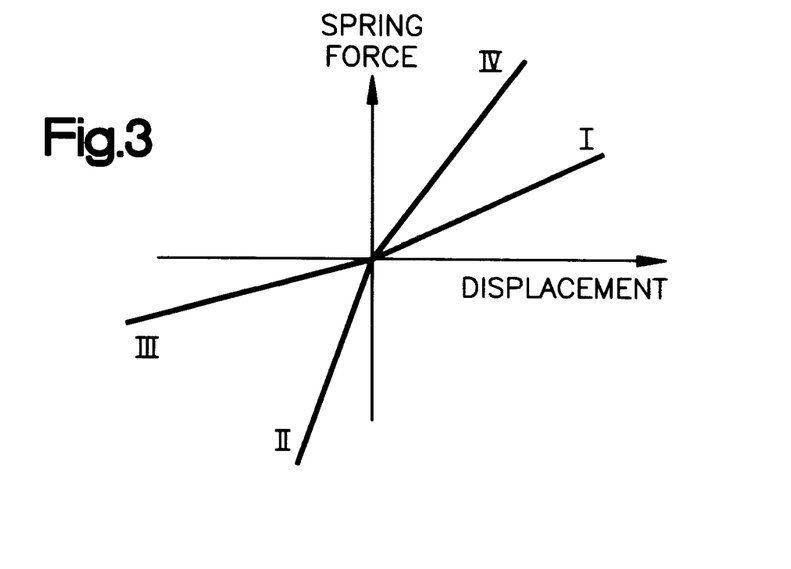
FIG. 3 is a graphical representation of spring force of a vehicle occupant as a function of occupant displacement for use with a spring mass model of the present invention.

Referring to FIG. 3, generalized values of spring force are shown as a function of displacement for a spring portion of a spring mass model. In the exemplary embodiment, the spring force is shown to vary linearly with displacement. Although, a single set of spring force versus displacement values for both belted and unbelted conditions are shown, it is possible to use two different spring force values, i.e., one for a belted occupant and one for an unbelted occupant. The spring force versus displacement values are divided into the four quadrants I, II, III, and IV which correspond to different ranges of displacement and velocity. In particular, each quadrant is defined by the sign (e.g., positive or negative) of the virtual occupant displacement and the sign of the virtual occupant velocity. The variable spring force for each of the quadrants has a slope that corresponds to a spring rate for that quadrant.

The slope (e.g., spring rate) for quadrant I ranges, for example, from about 1 to about 12 Hz. The slope for quadrant IV is greater than or equal to the slope for quadrant I. The slope for quadrant II is selected to be greater than or equal to that of quadrant III. The particular spring force values for each quadrant, including the slope thereof, are determined based on empirical testing for a particular vehicle platform. The spring force values are determined, for example, to account for dynamic forces on a vehicle occupant from the associated seat belt system as well as the vehicle seat itself.

Figure 4:
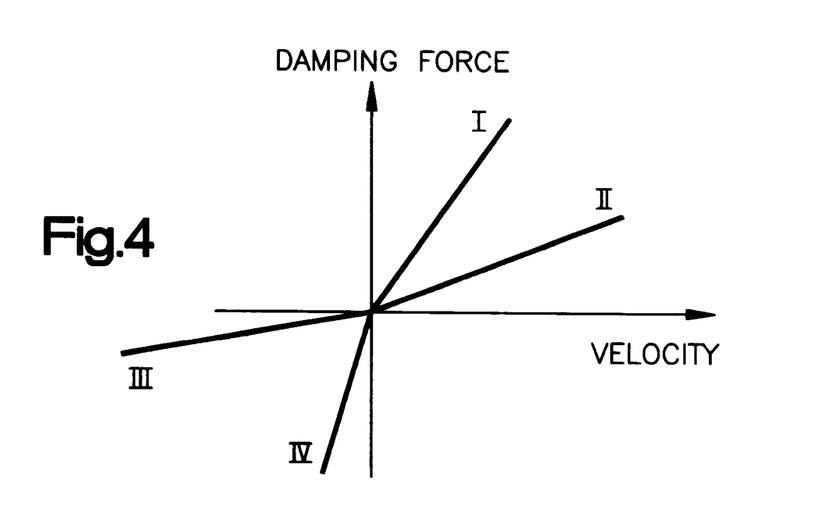
FIG. 4 is a graphical representation of damping force of a vehicle occupant as a function of occupant velocity for use with the spring mass model of the present invention.

Referring to FIG. 4, generalized values of damping force as a function of velocity are shown corresponding to the four different quadrants of FIG. 3. Accordingly, the damping values are functionally related to both determined velocity and determined displacement. In accordance with one embodiment of the present invention, the same damping force values are used for both the belted and unbelted occupant conditions. Of course, different damping values for belted and unbelted conditions could be used to achieve a desired crash discrimination. The damping force also could vary depending on the configuration of the associated vehicle seat.

In the exemplary embodiment of FIG. 4, the damping force is shown to vary linearly as a function of the determined virtual occupant velocity in each of the respective quadrants. The slope of the damping force function for each quadrant corresponds to a damping ratio for the respective quadrant. As stated above, the quadrants are selected based on the sign of the determined displacement and velocity values. In each of the quadrants, for example, the slope ranges from about 1.4 to about 1.8.

Referring back to FIG. 2, the controller 24 includes a spring force function 76 that outputs a spring force value (see FIG. 3) as a function of determined displacement for a determined velocity quadrant to a negative input 78 of the summing function 72. A damping function 80 outputs a damping value (see FIG. 4) as a function of determined velocity for a determined displacement quadrant to a negative input 82 of the summing function 72. The output 74 of the summing function 72 provides an "adjusted acceleration signal" that has been modified in response to the occupant spring-mass model to more nearly represent the acceleration of the vehicle occupant.

Specific values for the spring force function 76 and values for the damping function 80 are empirically determined to provide the desired crash discrimination for a particular vehicle platform and may incorporate other parameters, such as occupant weight, as sensed from an occupant weight sensor and/or any other sensed occupant characteristic. Initially, the values of the spring force function 76 and the viscous damping function 80 are set to zero. Their values change in response to a continuous determination of a crash velocity value and a crash displacement value from the adjusted acceleration signal 74.

The adjusted acceleration signal 74 is supplied to an input 86 of an integrator function 88. The integrator function 88 provides an output signal 90 value indicative of a crash velocity value determined by integrating the adjusted acceleration value 74 with respect to time. The velocity value 90 is referred to herein as a "virtual occupant velocity" arising from the adjusted acceleration 74.

The virtual occupant velocity value 90 is applied to an input 92 of a second integrator function 94 and to an input 96 of the viscous damping function 80. An output 98 of the second integrator 94 is a crash displacement value based on the adjusted acceleration signal 74. The crash displacement value 98 is referred to herein as a "virtual occupant displacement" arising from the adjusted acceleration 74.

The displacement value 98 is applied to an input 100 of the spring force function 76 and to an input 102 of the viscous damping function 80. In the exemplary embodiment of the present invention, the spring force values, which are a function of displacement, and the viscous damping values, which are a function of velocity for a particular displacement range, may be stored in a look-up table or may be calculated. In an analog embodiment of the present invention, conventional circuit network techniques may be employed to fabricate functional blocks having desired transfer characteristics.

The virtual occupant displacement value 98 is output to a displacement indexing function 104 ("D INDEX"). The indexing function 104 categorizes the displacement value 98 into one of a plurality of possible discrete range of displacement values and provides an indexed displacement value 105 as a function of the displacement value 98. The indexed displacement value 98 is used to index variable thresholds of threshold determining functions 106 and 108 as a function of the particular displacement range within which the displacement value 98 falls.

In the exemplary embodiment shown in FIG. 2, the AHR threshold determining function 106 ("AHR_THRESHOLD_VD") corresponds to a variable threshold value used for discriminating a rear impact vehicle crash event for which actuation of the AHR 44 is desirable. The AHR threshold function 106 provides a threshold value 110 that varies, such as in a stepwise fashion due to the index function 104, as a function of the virtual occupant displacement value 98 for a vehicle occupant. The functional relationship between the threshold value 110 and displacement value 98 is, for example, empirically determined for a particular vehicle platform of interest so as to achieve desired crash discrimination. In this embodiment, the values of the AHR threshold function 106 are determined for an unbelted vehicle occupant through empirical methods and are intended to control actuation of the AHR 44. The AHR threshold values must be set high enough so as to protect against deployment during non-deployment rear impact crash events. As described below, other means are provided to help protect against deployment of the AHR during non-deployment crash events.

The virtual occupant velocity value 90 is supplied to one input of a comparator function 112. The output value 110 of the AHR function 106 is supplied to another input of the comparator 112. The comparator 112 determines whether the occupant's virtual velocity value 90 is less than the displacement-dependent threshold value 110. If the determination is affirmative, a digital HIGH (i.e., a TRUE condition) is output to a SET input ("S") of a latch function 116. The latch function 116 latches the HIGH or TRUE state at the output of the latch function 116.

The output value 105 of the indexing function 104 is also supplied to the front threshold determining function 108 ("FRONT_THRESHOLD_VD"). The front threshold determining function 108 is similar to the AHR threshold determining function 106 in that it provides a relative velocity threshold that varies in a stepwise fashion (due to the indexing function 104) as a function of the determined displacement value 98. Again, the functional relationship between the front threshold determining function 108 is determined empirically for a particular vehicle platform to achieve desired crash discrimination for a front vehicle crash event.

Figure 5:
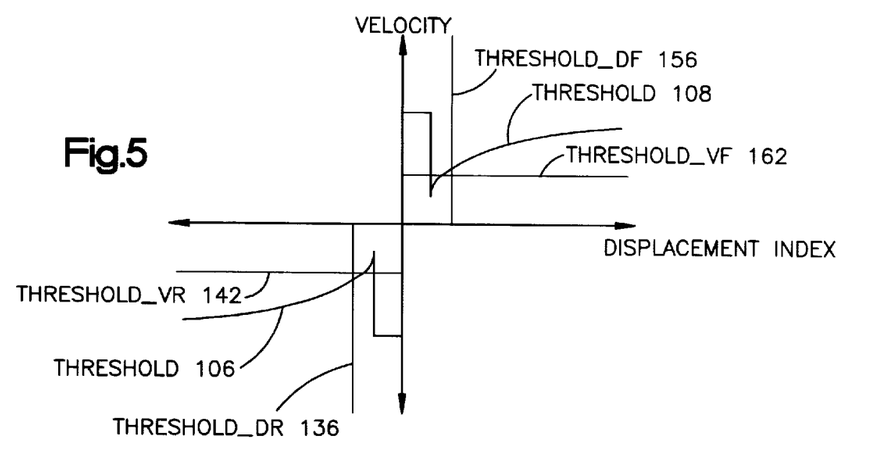
FIG. 5 is a graphical representation of threshold values used in the exemplary embodiment of the system of FIG. 2, with the value of occupant crash velocity (relative to vehicle coordinates) being on the Y-axis and occupant crash displacement (relative to vehicle coordinates) being on the X-axis.

FIG. 5 is a graph generally depicting an example of the threshold value output from AHR threshold function 106 (indicated at "THRESHOLD 106") and the threshold value output from the front threshold value 108 (indicated at "THRESHOLD 108"). The X-axis corresponds to the displacement index value provided by the D INDEX function 104 indicative of determined occupant displacement. As shown, the value of each threshold function 106, 108 varies as a function of displacement index value 105 in response to determined displacement value 98. Displacement to the right of zero are displacements resulting from a frontal collision. Displacement to the left of zero result from a rear collision.

Referring back to FIG. 2, an output 118 of the front threshold determining function 108 is supplied to an input of a comparator function 120. The comparator function 120 includes another input connected to the virtual occupant velocity value 90. The comparator 120 provides a HIGH (i.e., a TRUE condition) output when the velocity value 90 is greater than the displacement-dependent variable threshold value 118. The output of comparator 120 is connected to a SET input ("S") of a latch function 122. The latch function 122 latches the occurrence of a HIGH or TRUE condition at the output of the latch function 122.

Each of the latch functions 116, 122 has an associated RESET input ("R") connected to receive the virtual occupant displacement output 98 of the integrator 94. For example, if the value of the virtual occupant displacement value 98 drops below a predetermined value (e.g., corresponding to a forward occupant displacement relative to orientation of the accelerometer in the vehicle), the latch 122 is reset. Similarly, when the displacement value 98 increases above a predetermined value (e.g., corresponding to a rearward occupant displacement relative to the orientation of the accelerometer in the vehicle), the latch 116 is reset. When the latches 116 and 122 are reset, they provide a digital LOW (i.e., NOT TRUE condition) at their output. In a microcomputer embodiment of the controller 24, the latch functions 116 and 122, including their being reset as function of determined displacement, are implemented as software store in memory.

The output of latch 116 is connected to an input of an AND function 126. The output of the latch 122 is connected to an input of another AND function 128.

Another input of the AND function 126 is connected to a rear safing function 130. The rear safing function 130 receives a signal from a rear safing sensor 131, such as, for example, one or more of the rear crush zone sensors 26 and 28 and/or the other sensors 36 (FIG. 1). Another input of the AND function 126 is connected to a rough road immunity metric 132.

The rough road immunity metric 132 determines whether the virtual occupant displacement value 98 or the virtual occupant velocity value 90 are less than predetermined threshold values. Specifically, the virtual occupant displacement value 98 is provided to an input of a comparator function 134. Another input of the comparator function 134 receives a value from a rear displacement threshold function 136 ("Threshold_DR"). The comparator 134 determines whether the displacement value 98 is less than the value of the rear displacement threshold function 136. The comparator function 134 provides a logic HIGH output when the determined displacement value 98 is less than the threshold value. The comparator function 134 provides its output value to an input of an OR function 138. An example of the rear displacement threshold function 136 is depicted in FIG. 5 at "THRESHOLD_DR 136."

Another aspect of the rough road immunity metric 132 includes providing the virtual occupant velocity value 90 to an input of another comparator function 140. A rear velocity threshold function 142 ("THRESHOLD_VR") is provided to another input of the comparator function 140. The comparator 140 compares the occupant velocity value 90 with the threshold value 142 and provides an output signal indicative thereof. Specifically, the comparator 140 provides a digital HIGH (i.e., TRUE condition) at its output when the virtual occupant velocity value 90 is less than the value of the rear velocity threshold function 142. The output of the comparator function 140 is provided to another input of the OR function 138. The threshold values 136 and 142 are selected to require at least either minimum displacement or minimum velocity values to enable actuation of the AHR 44. The OR function 138 provides an output signal to another input of the AND function 126 indicating whether such minimum criteria is met. An example of the rear velocity threshold function 142 is depicted in FIG. 5 at "THRESHOLD_VR 142."

The AND function 126 provides a digital TRUE output only if all three inputs are TRUE. Specifically, the rear safing function 130 must supply a TRUE output (i.e., verifying the occurrence of a rear impact by another sensor 131). Additionally, the OR function 138 must provide a TRUE output to the AND function 126, indicating that at least either a minimum displacement or velocity value has been determined. In this way, the rear safing sensor 130 and the rough road immunity metric 132 help protect against actuation of the AHR 44 during non-deployment crash events, even if the comparator function 112 provides a TRUE output signal.

In order to help protect against actuation of the front air bag 46 in non-deployment front collisions, a frontal safing function 150 is connected to an input of the AND function 128. The frontal safing function 150 receives a signal from a front safing sensor 151, such as, for example, one or more of the front crush zone sensors 30–34 and/or the other sensor 36 (FIG. 1). Another input of the AND function 128 is connected to a frontal rough road immunity metric 152.

The rough road immunity metric 152 is similar to the rear rough road immunity metric 132 described above. Briefly stated, the immunity metric 152 includes a comparator function 154 that determines whether the virtual occupant displacement value 98 is greater than the value of a front displacement threshold function 156 ("Threshold_DF"). The comparator 154 provides a logic output value to an input of an OR function 158 based on the comparison. Another aspect of the rough road immunity metric 152 includes a comparator function 160 that determines whether the virtual occupant velocity value 90 is greater than the value provided by a frontal velocity threshold function 162 ("THRESHOLD_VF"). The comparator 160 provides a digital signal (i.e., TRUE or FALSE) to another input of the OR function 158 based on the comparison of the occupant velocity value 90 and the value of the frontal velocity threshold function 162. Examples of the frontal displacement and frontal velocity thresholds 156 and 162 are illustrated in FIG. 5 at "THRESHOLD_DF 156" and "THRESHOLD_VF 162," respectively.

Assuming now, for purposes of explanation, that the output of the rear safing function 130 is HIGH (i.e., in response to the rear safing sensor 131 detecting a rear impact crash event), and either (i) the virtual occupant displacement value 98 is determined to be less than the rear displacement threshold value 136 or (ii) that the virtual occupant velocity value 90 is determined to be less than the rear velocity threshold value 142, then the output of the AND function 126 would be HIGH provided that the virtual occupant velocity value 90 also is less than the threshold value 110. This establishes a TRUE condition at a TTF_AHR function 166. The TTF_AHR function 166 latches the output of AND function 126 to a fire controller 168. The fire controller 168 is, in turn, connected to at least one of the AHR 44 and the associated seat belt pretensioner 52 for controlling their actuation in response to the value of the TTF_AHR function 166.

Similarly, the output of the AND function 128 is provided to a TTF_FRONT function 170. Assuming, for purposes of explanation, that the output of the frontal safing function 150 is HIGH (i.e., in response to the front safing sensor detecting a frontal vehicle crash event), and that either (i) the virtual occupant displacement value 98 is determined to be greater than the frontal displacement threshold value 156 or (ii) the virtual occupant velocity value 90 is determined to be greater than the front velocity threshold value 162, then the output of the AND function 128 would be HIGH provided that the virtual occupant velocity value 90 also is greater than the front threshold value 118. This establishes a TRUE condition at a TTF_FRONT function 170. The value of the TTF_FRONT function 170 is provided to the fire controller 168 for controlling actuation of at least one of the frontal air bag 46 and the associated seat belt pretensioner 52.

The buckle switch 38 associated with the vehicle seat (e.g., 42 of FIG. 1) also provides a buckle switch signal to the fire controller 168 for controlling actuation of the seat belt pretensioner 52. The fire controller 168 actuates the seat belt pretensioner 52 when the buckle switch signal has a value indicative of a belted condition and either the TTF_AHR function 166 or the TTF_FRONT function 170 provides a digital TRUE condition to the fire controller. The seat belt pretensioner 52 may, thus, be actuated during a frontal vehicle crash event or a rear impact crash event.

While, for purposes of brevity, the exemplary embodiment of FIG. 2 has described a single stage frontal air bag 46 which is actuated in response to a TTF determination 170, the present invention also contemplates the use of a multi-stage air bag. An example of a control algorithm for a multi-stage air bag device is disclosed in U.S. patent application Ser. No. 09/108,819. Other control algorithms also could be used to, in accordance with the present invention, control a single or multi-stage vehicle occupant protection device.

Figure 6:
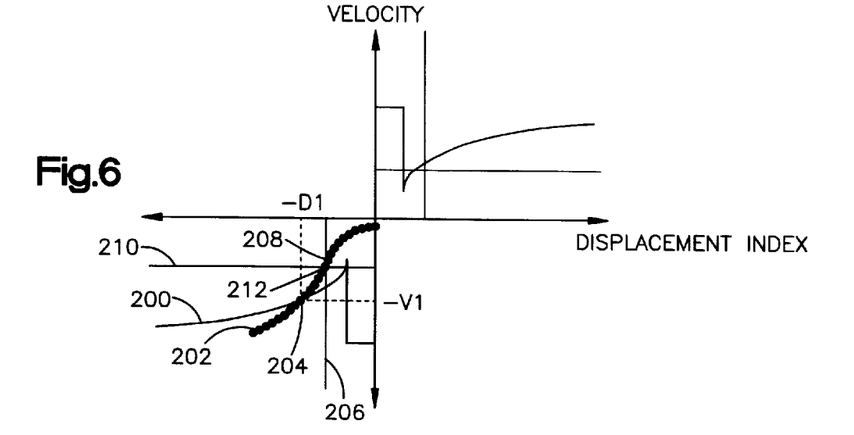
FIG. 6 is a graphical representation of determined occupant crash velocity versus occupant crash displacement illustrating an example of a rear impact vehicle crash event.

FIG. 6 illustrates an example of a rear impact vehicle crash event in which the AHR 44 is actuated. The value of the rear AHR threshold (e.g., AHR THRESHOLD_VD 106 of FIG. 2) is indicated at 200. As mentioned above, the AHR threshold value 200 is functionally related to occupant displacement, such as provided by the discrete value 105 of the displacement index function 104 shown in FIG. 2. The virtual occupant velocity values (e.g., 90 of FIG. 2) versus indexed displacement values for this vehicle crash condition are shown by dots at 202. The virtual occupant velocity 202 begins at about zero and decreases due to orientation of the accelerometer in the vehicle. The velocity value 202 crosses the threshold 200 at a point 204, which corresponds to a determined velocity value of $-V_1$ and a determined displacement value of $-D_1$.

FIG. 6 also shows that both conditions of the rear rough road immunity metric (e.g., 132 of FIG. 1) are satisfied. Specifically, the determined occupant displacement value, as defined by the virtual occupant velocity value 202, crosses a rear displacement threshold 206 (e.g., THRESHOLD_DR 136 of FIG. 2) at point 208. The determined velocity 202 continues to decrease and crosses the rear velocity threshold 210 (e.g., THRESHOLD_VR 142 of FIG. 1) at point 212. Provided that the rear safing function (e.g., 130 of FIG. 1)

also provides a digital TRUE output value, the TTF_AHR function will pass a TRUE condition to the fire controller to actuate the AHR 44 upon crossing the threshold 200 at point 204. If the buckle switch 38 indicates that the occupant is belted, the seat belt pretensioner 52 also would be actuated in this situation.

Figure 7:
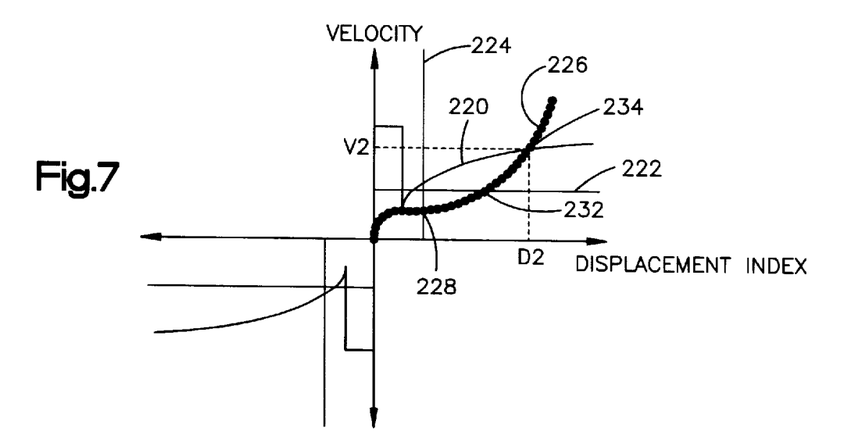
FIG. 7 is a graphical representation of determined occupant crash velocity versus occupant crash displacement illustrating an example of a frontal impact vehicle crash event.

FIG. 7 illustrates an example of a frontal vehicle crash event for a deployment crash condition. The frontal variable threshold value (e.g., the output value 118 from the FRONT_THRESHOLD_VD 108 of FIG. 2) is indicated at 220. As mentioned above, the frontal variable threshold 220 has a value functionally related to an indexed value of occupant displacement, which is determined based on the adjusted crash acceleration value. Also depicted in FIG. 7 are a rough road immunity threshold for velocity 222 (e.g., THRESHOLD_VF 162 of FIG. 2) and an immunity threshold for displacement 224 (e.g., THRESHOLD_DF 156 of FIG. 2). The virtual velocity values versus indexed displacement during the frontal vehicle crash event are illustrated as dots at 226. Both the virtual occupant displacement and virtual occupant velocity values are determined based on the adjusted crash acceleration. In contrast to the determined virtual velocity value for the rear impact crash event shown in FIG. 6, the determined virtual velocity 226 starts at 0 and increases (i.e., in the positive direction relative to the orientation of the accelerometer in the vehicle). The determined virtual velocity value 226 crosses the displacement threshold 224 at point 228 and continues increasing to cross the velocity threshold 222 at point 232. As mentioned above, crossing either threshold 224, 230 is sufficient to indicate that the vehicle is experiencing more than ordinary rough road conditions. The determined virtual velocity value 226 then increases from point 232 to cross the frontal variable threshold 220 at point 234, which corresponds to a virtual occupant displacement value of $D_2$ and a virtual occupant velocity value of $V_2$. Provided that the frontal safing function (e.g., 150 of FIG. 2) also has detected a frontal vehicle crash event, at least the front air bag 46 will be actuated. The TTF_FRONT function (e.g., 170 of FIG. 2) then provides a TRUE condition to the fire controller for controlling actuation of at least the frontal air bag 46. If the fire controller 168 also receives a signal from the buckle switch 38, indicating a belted vehicle occupant condition, the seat belt pretensioner 52 also would be actuated in this situation.

While the exemplary embodiment of FIG. 2 has been described with respect to the driver side vehicle seat 42 and associated occupant protection devices 44, 46 and 52, a similar algorithm is employed for controlling actuation of the passenger side vehicle occupant protection equipment 48, 50, and 54. Other sensors also may be provided to help control actuation of the occupant protection devices. For example, one or more occupant condition sensors, such as occupant presence sensors, weight sensors, and occupant position sensors, may be used with a system in accordance with the present invention to enable or disable the associated occupant protection devices based on the condition(s) sensed thereby. Such other occupant condition sensors also may be used to control actuation of the protection device, such as in a situation where a multi-stage inflatable occupant protection device is used.

From the above description of the invention, those skilled in the art will perceive improvements, changes and modifications. Such improvements, changes and modifications within the skill of the art are intended to be covered by the appended claims.

Having described the invention, the following is claimed:

1. A system for controlling an actuatable occupant protection device, said system comprising:

an actuatable headrest device which, when actuated, helps protect an occupant of a vehicle seat;

a crash sensor operative to sense a crash condition of a vehicle and provide a crash sensor signal having an electrical characteristic indicative of the sensed vehicle condition; and a controller coupled to said actuatable headrest restraint device and said crash sensor, said controller determining a crash velocity value and a crash displacement value based on said crash sensor signal, said controller having a variable threshold value functionally related to said determined crash displacement value, said controller controlling actuation of said actuatable headrest device in response to said determined crash velocity value relative to said threshold value.

2. A system as set forth in claim 1 wherein said controller controls actuation of said actuatable headrest device in response to said determined crash velocity value crossing said threshold value.

3. A system as set forth in claim 2 wherein said controller controls actuation of said actuatable headrest device in response to said determined crash velocity value being less than said threshold value.

4. A system as set forth in claim 2 wherein said crash sensor is an acceleration sensor that senses vehicle crash acceleration and provides a crash acceleration signal having an electrical characteristic indicative of the sensed vehicle crash acceleration, each of said crash velocity and crash displacement values being determined as a function of said crash acceleration signal.

5. A system as set forth in claim 4 wherein said system further includes an actuatable seat belt pretensioning device associated with the vehicle seat, a seat belt condition sensor for sensing whether the occupant is belted or unbelted relative to the vehicle seat and providing a seat belt sensor signal indicative thereof, said controller controlling actuation of the seat belt pretensioning device in response to (i) said determined crash velocity value crossing said threshold value and (ii) said seat belt sensor signal indicating a belted occupant condition.

6. A system as set forth in claim 4 further including an actuatable frontal occupant protection device, said threshold value being a first threshold value functionally related to said determined crash displacement value, said-controller having a second threshold value functionally related to said determined crash displacement value, said controller controlling actuation of said frontal occupant protection device in response to said determined crash velocity value crossing said second threshold value.

7. A system as set forth in claim 6 wherein said controller controls actuation of said actuatable headrest device in response to said determined crash velocity value being less than said first threshold value, said controller controlling actuation of said frontal occupant protection device in response to said determined crash velocity value being greater than said second threshold value.

8. A system as set forth in claim 4 further including a safing sensor which is operative to detect a vehicle crash event and provide a safing signal in response to detecting the vehicle crash event, said controller controlling actuation of said actuatable headrest device in response to (i) said determined crash velocity value crossing said threshold value and (ii) said safing signal indicating a vehicle crash event.

9. A system as set forth in claim 8 wherein said safing sensor is a crush zone sensor located at a rear location of the vehicle so as to be subjected to crash acceleration relatively early during a rear crash condition, said crush zone sensor providing a crush zone signal indicative thereof.

10. A system as set forth in claim 8 wherein said controller, to effect actuation of said actuatable headrest device, further requires at least one of (i) said determined crash velocity value being less than a velocity threshold and (ii) said determined crash displacement value being less than a displacement threshold.

11. A method for helping protect a vehicle occupant during a vehicle crash event, said method comprising the steps of:
sensing vehicle crash acceleration;
determining a crash velocity value as a function of the sensed crash acceleration;
determining a crash displacement value as a function of the sensed crash acceleration;
providing a variable threshold having a value functionally related to the crash displacement value; and
controlling actuation of an actuatable headrest device associated with a vehicle seat in response to the determined crash velocity value relative to the value of the threshold.

12. A method as set forth in claim 11 wherein said step of controlling further includes controlling actuation of the actuatable headrest device in response to the determined crash velocity value crossing the threshold value.

13. A method as set forth in claim 12 wherein said step of controlling further includes controlling actuation of the actuatable headrest device in response to the determined crash velocity value being less than the threshold value.

14. A method as set forth in claim 13 further including the steps of providing an actuatable seat belt pretensioning device associated with the vehicle seat, sensing whether the occupant is belted or unbelted relative to the vehicle seat, and controlling actuation of the seat belt pretensioning device in response to (i) determining that the crash velocity value is less than said threshold value and (ii) sensing that a vehicle occupant is belted relative to the vehicle seat.

15. A method as set forth in claim 12 wherein the threshold value is a rear threshold value and said method further includes providing a frontal threshold value functionally related to the determined crash displacement value, and controlling actuation of a frontal occupant protection device associated with the vehicle seat in response to the determined crash velocity value crossing the frontal threshold value.

16. A method as set forth in claim 15 further including controlling actuation of the actuatable headrest device in response to the determined crash velocity value being less than the rear threshold value and controlling actuation of the frontal occupant protection device in response to the determined crash velocity value being greater than the frontal threshold value.

17. A method as set forth in claim 12 further including the step of providing a safing signal in response to a safing sensor detecting the vehicle crash event, said step of controlling actuation of the actuatable headrest device further including controlling actuation of the actuatable headrest device in response to determining that (i) the crash velocity value is less than the threshold value and (ii) the safing signal indicates a vehicle crash event.

18. A method as set forth in claim 17 wherein said step of controlling actuation of the actuatable headrest device, is further dependent upon determining that at least one of (i) the crash velocity value being less than a velocity threshold and (ii) the crash displacement value being less than a displacement threshold.

19. A system for controlling an actuatable occupant protection device, said system comprising:
an actuatable headrest device which, when actuated, helps protect an occupant of a vehicle seat;
an acceleration sensor that senses vehicle crash acceleration and provides a crash acceleration signal having an electrical characteristic indicative of the sensed vehicle crash acceleration; and
a controller coupled to said actuatable headrest restraint device and said acceleration sensor, said controller including processing means for processing said acceleration signal with an occupant spring mass model so as to provide an adjusted crash acceleration signal, said controller determining a crash velocity value and a crash displacement value based on the adjusted crash acceleration signal, said controller having a threshold value functionally related to said determined crash displacement value, said controller controlling actuation of said actuatable headrest device in response to said determined crash velocity value relative to said threshold value.

20. A system as set forth in claim 19 wherein said processing means further includes means for adjusting the value of said acceleration signal by a spring force term and a viscous damping term of said spring mass model.

21. A method for helping protect a vehicle occupant during a vehicle crash event, said method comprising the steps of:
sensing vehicle crash acceleration;
processing said acceleration signal with an occupant spring mass model so as to provide an adjusted crash acceleration signal;
determining a crash velocity value as a function of the adjusted crash acceleration signal;
determining a crash displacement value as a function of the adjusted crash acceleration signal;
providing a threshold having a value functionally related to the crash displacement value; and
controlling actuation of an actuatable headrest device associated with a vehicle seat in response to the determined crash velocity value relative to the value of the threshold.

22. A method as set forth in claim 21 further including adjusting the value of the acceleration signal by a spring force term and a viscous damping term of the spring mass model.

* * * * *